United States Patent [19]

Shields

[11] Patent Number: 4,738,331
[45] Date of Patent: Apr. 19, 1988

[54] ELECTRIC MOTOR DRIVEN SPEED CONTROL

[75] Inventor: Neal G. Shields, Ft. Worth, Tex.

[73] Assignee: Specific Cruise Systems, Inc., Fort Worth, Tex.

[21] Appl. No.: 930,674

[22] Filed: Nov. 14, 1986

[51] Int. Cl.$^4$ .............................................. B60K 31/06
[52] U.S. Cl. ....................................... 180/177; 180/179
[58] Field of Search .............. 180/175, 177, 178, 179; 123/360 US, 361 US, 352 US

[56] References Cited

U.S. PATENT DOCUMENTS

| | | | |
|---|---|---|---|
| 2,897,906 | 8/1959 | Brueder | 180/178 X |
| 3,092,090 | 6/1963 | Berninger | 123/103 |
| 3,099,330 | 7/1963 | Von Berg et al. | 180/82.1 |
| 3,183,994 | 5/1965 | Goerke et al. | 180/82.1 |
| 3,207,255 | 9/1965 | Hahlganss et al. | 123/361 X |
| 3,575,257 | 4/1971 | Wojcikowski | 180/105 |
| 3,727,714 | 4/1973 | Ishikawa | 180/108 |
| 4,120,373 | 10/1978 | Fleischer | 180/179 |
| 4,161,994 | 7/1979 | Collonia | 123/361 X |
| 4,304,202 | 12/1981 | Schofield | 123/363 |
| 4,335,799 | 6/1982 | Shields | 180/175 |
| 4,345,663 | 8/1982 | Shields | 180/177 |
| 4,565,963 | 1/1986 | Shaw | 324/51 |

FOREIGN PATENT DOCUMENTS

113737 6/1985 Japan .
576420 4/1946 United Kingdom .

OTHER PUBLICATIONS

IEEE Spectrum, "More Electronics in Detroit's 1985 Models", Ronald K. Jurgen, Oct. 1984, pp. 54–60.
IEEE Spectrum, "Less Sizzle, More Beef for Detroit in '86", Ronald K. Jurgen, Oct. 1985, pp. 77–83.
IEEE Spectrum, "Detroit's 1987 Models: New Electronic Inroads", Ronald K. Jurgen, Oct. 1986, pp. 68–72.
William Barden, Jr., "Z-80 Microcomputer Design Projects", Howard W. Sams & Co., Inc., pp. 158–162 and preface.

*Primary Examiner*—David M. Mitchell
*Assistant Examiner*—Tamara L. Finlay
*Attorney, Agent, or Firm*—James E. Bradley

[57] ABSTRACT

A speed control device for a motor vehicle uses a conventional DC electric motor. The motor has a freewheeling shaft, unless power is supplied. An advancing linkage connected between the shaft and throttle advances the throttle when power is supplied. A piston in a cylinder is connected to the shaft also, to selectively prevent the shaft from rotating in a retracting direction when power is off. A microcomputer opens a valve to allow the piston to move outward in the cylinder when a speed decrease is desired.

4 Claims, 1 Drawing Sheet

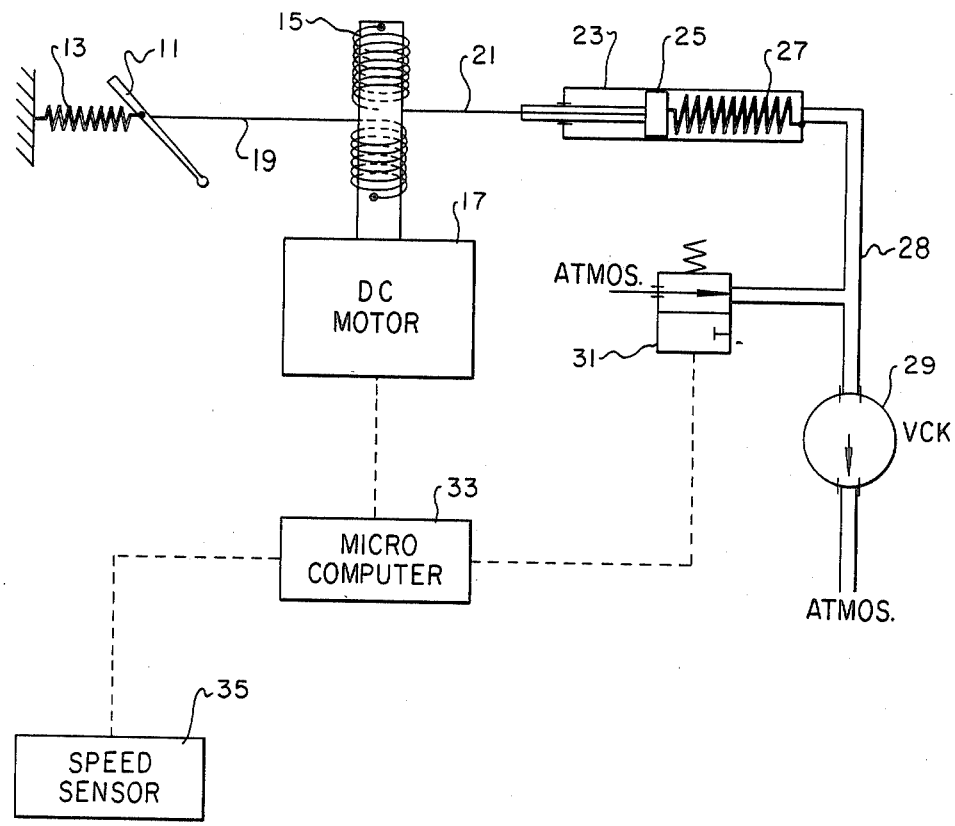

ELECTRIC MOTOR DRIVEN SPEED CONTROL

BACKGROUND OF THE INVENTION

1. Field of the Invention

This invention concerns a device for controlling the speed of a motor vehicle, and more particularly one which does not require engine vacuum to operate.

2. Description of the Prior Art

Speed or "cruise" controls are in widespread use. The speed control allows the driver to select a speed, and the control device will maintain the vehicle at the selected speed. Most speed controls use the engine vacuum to pull a piston in a chamber. The piston is connected to the throttle linkage. A vacuum valve closes to apply more vacuum if the speed drops below the selected level. A vent valve opens to release vacuum if the speed is above the selected level. A microcomputer chip monitors the speed and controls the valves.

While successful, in some cases, especially those with small engines, the vacuum supply is inadequate to control the speed. Electric motors are used in some cases for speed control in lieu of vacuum. They either use a sensitive stepping motor or a motor with gear drive and a clutch. These systems are expensive. Also, reliability can be a problem.

SUMMARY OF THE INVENTION

This invention employs an ordinary DC motor which has a shaft that freewheels when no power is supplied to the motor. A microcomputer provides discrete power pulses to the electric motor. These pulses cause the shaft to rotate in a direction which advances a linkage means, preferably a cable, connecting the shaft to the vehicle throttle. Such advancement causes the throttle to open and the vehicle speed to increase. When the desired speed is achieved, the microcomputer generated power pulses cease.

A separate sustaining linkage prevents the shaft from rotating in the receeding direction in response to the throttle spring until such rotation is desired.

The sustaining means preferably comprises a piston located within a cylinder, the piston is connected to a cable that is wrapped around the motor shaft in a direction opposite to the cable connecting the throttle and the motor shaft. When the throttle pulls the cable to rotate the motor shaft in reverse, the piston resists the rotation because its movement toward the shaft tends to draw a vacuum in the cylinder. A vent valve allows the piston to move toward the shaft if a speed decrease is required.

The microcomputer also controls the sustaining means, and activates or deactivates the vent valve as needed. A speed sensor provides the microcomputer with current velocity information, thus allowing the microcomputer to perform calculations and activate or deactivate the sustaining means as desired, and provide power pulses to the DC motor as desired.

BRIEF DESCRIPTION OF THE DRAWINGS

FIG. 1 is a drawing of the preferred embodiment of this electric motor driven speed control device.

DESCRIPTION OF THE PREFERRED EMBODIMENTS

The present invention will now be explained hereunder with reference to the illustrated embodiment. This invention operates upon a conventional throttle 11 which is biased by a spring 13 so that the throttle is urged to the idle position. A rotatable shaft 15 of a conventional DC (direct current) motor 17 is used to control the throttle 11. Motor 17 will rotate when supplied with power, and freewheels when not. Motor 17 is connected to throttle 11 by means of an advancing linkage means comprising a cable 19. Cable 19 has one end wrapped around shaft 15, so that when power is supplied to motor 17, the shaft 15 will take up cable 19 to advance throttle 11. When power is not being supplied to DC motor 17, the throttle spring 13 would urge the throttle 11 to the idle position and all velocity gains would be lost were it not for a sustaining means. This occurs because DC motor shaft 15 freewheels when the DC motor 17 is not engaged.

In this embodiment, the sustaining means is a piston 25 in a cylinder 23, the piston 25 being urged to the inner end of the cylinder 23 by a spring 27. The outer end of piston 25 is connected to the DC motor shaft 15 by cable linkage means 21. Spring member 27 is a light spring and can be easily overpowered by throttle spring 13 if this system had no other sustaining features. However, the space in cylinder 23 between piston 25 and the inner end of cylinder 23 is air tight, having only two openings. A conduit 28 leads from the inner end of cylinder 23 to a check valve 29, and allows air to be expelled from cylinder 23 any time the piston 25 is pulled toward the inner end by spring 27. Check valve 29 prevents air from the atmosphere from being drawn into the cylinder 23.

Conduit 28 is also connected to a two-way valve 31, shown in the open position in the drawing, which connects the conduit 28 to atmosphere. This allows air to enter the chamber of cylinder 23, allowing piston 25 to freely move toward the outer end of cylinder 23. In the closed position, valve 31 blocks atmospheric pressure from the conduit 28. Valve 31 is biased to the open position.

Valve 31 is connected to a microcomputer 33, which moves the valve 31 between the open and closed positions by electrical signals. Microcomputer 33 receives speed data from speed sensor 35 and also provides power pulses to DC motor 17, and operates valve 31. Microcomputer 33 is a conventional element such as used in vacuum speed control systems, but programmed to operate motor 17 and valve 31.

In operation, speed sensor 35 provides speed data information to microcomputer 33. Microcomputer 33 performs calculations upon the speed data. If an increase in speed is desired, microcomputer 33 closes valve 31 so that the space in cylinder 23 between piston 25 and the inner end of cylinder 23 is closed to atmosphere. Next, microcomputer 33 provides discrete power pulses to DC motor 17, causing the DC motor shaft 15 to rotate in the advancing direction. Such rotation of DC motor shaft 15 causes the advancing linkage cable 19 to wind around shaft 15 and pull against throttle spring 13 to open throttle 11 resulting in an increased vehicle speed.

Since the DC motor shaft 15 is a freewheeling shaft, such vehicle speed would be lost quickly when microcomputer 33 ceases pulsing the DC motor 17, were it not for sustaining cable 21. Sustaining cable 21 serves to hold the motor shaft 15 in a stable position, to keep sustaining cable 19 from unwinding, and to keep the throttle 11 in a stable state. As motor shaft 15 rotates to pull throttle 11 open, spring 27 pulls piston 25 and cable 21 to take up the slack created in cable 21. The inward motion of piston 25 would create a pressure difference between the cylinder chamber and atmosphere were it not for check valve 29, which operates to release air from the chamber keeping the cylinder chamber at atmospheric pressure. Piston 25 will not move in the outward direction because to do so would draw a vacuum between piston 25 and the inner end of cylinder 23. Thus, light spring 27 will draw piston 25 toward the inner end of cylinder 23 when there is slack in cable 21. When valve 31 is closed to atmosphere, piston 25 will remain in that position.

When a decrease in speed is desired, microcomputer 33 opens valve 31 to atmosphere which allows piston 25 to move toward the outer end of cylinder 23 in response to the force exerted by the throttle spring 13. DC motor shaft 15 will then freewheel in a direction couter to the advancing direction. Retracting cable 19 will respond to the force of throttle spring 13, and will unwind. Throttle 11 will be moved toward the idle position. When the information provided by speed sensor 35 indicates to microcomputer 33 that the desired decrease in velocity has been achieved, microcomputer 33 closes valve 31. Consequently, piston 25 will no longer advance toward the outer end of cylinder 23, the movement of DC motor shaft 15 will be arrested, the position of throttle 11 will be fixed, and the desired velocity will be maintained.

The invention has significant advantages. The speed control system does not use engine vacuum, allowing it to be used in low vacuum vehicles. The system does not require clutch and gears, which are expensive and subject to maintenance problems. The system does not require an expensive stepping motor.

While the invention has been described in only one of its forms, it should be apparent to those skilled in the art that it is not so limited, but is susceptible to various changes and modifications without departing from the spirit thereof.

I claim:

1. An apparatus for controlling the speed of a motor vehicle of the type having a throttle and a spring means for urging the throttle toward an idle position which comprises:
    a DC electric motor of the type that has a shaft which rotates in an advancing direction when power is supplied and which freewheels when the power is off;
    advancing means connected between the motor shaft and the throttle, for advancing the throttle when the motor is supplied with power;
    a sustaining means for preventing the spring means from rotating the motor shaft in a retracting direction when a desired vehicle speed is achieved, and for allowing the spring means to rotate the motor shaft in the retracting direction when a decrease in vehicle speed is desired;
    a microcomputer means for supplying power to the motor to rotate the motor shaft when an increase in vehicle speed is desired, and for deactivating the motor when the desired vehicle speed is achieved, and for controlling the sustaining means; and
    sensing means for continuously detecting vehicle speed and providing signals to the microcomputer means.

2. An apparatus for controlling the speed of a motor vehicle of the type having a throttle and a spring means for urging the throttle toward an idle position which comprises:
    a DC electric motor of the type that has a shaft which rotates in an advancing direction when power is supplied and which freewheels when the power is off;
    a cylinder having an inner end and an outer end;
    a piston within the cylinder;
    bias means for urging the piston toward the inner end of the cylinder;
    check-valve means for allowing air to escape through the check valve means from the cylinder to the atmosphere when the piston moves toward the inner end of the cylinder, for preventing air from entering the cylinder through the check valve means from the atmosphere when the piston is stationary and when the piston is moving outward relative to the inner end of the cylinder;
    control valve means which in an open position opens the inner end of the cylinder to atmosphere to enable the piston to be moved outward, and which in a closed position closes the inner end of the cylinder to prevent the piston from moving outward;
    advancing linkage means, connecting the motor shaft and the throttle, for advancing the throttle by rotating the shaft in an advancing direction when the motor is supplied with power, and for urging the motor shaft to rotate in a retracting direction due to the force of the spring means when the power to the motor is off;
    sustaining linkage means, connecting the piston to the motor shaft, for preventing the shaft from rotating in the retracting direction when the control valve means is closed;
    microcomputer means for activating the motor to rotate, and the control valve means to close when an increase in vehicle speed is desired; and for deactivating the motor, and opening the control valve means when a decrease in speed is desired to allow the spring means to retract the throttle; and
    sensing means for continuously detecting vehicle speed and providing signals to the microcomputer means.

3. An apparatus for controlling the speed of a motor vehicle of the type having a throttle and a spring means for urging the throttle toward an idle position which comprises:
    a DC electric motor of the type that has a shaft which freewheels when the power is off, and which rotates in an advancing direction when the power is on;
    a cylinder having an inner end and an outer end;
    a piston within the cylinder;
    spring means for urging the piston toward the inner end of the cylinder;
    check valve means for allowing air to escape through the check valve means from the cylinder to the atmosphere when the piston moves toward the inner end of the cylinder for preventing air from entering the cylinder through the check valve means from the atmosphere when the piston is stationary and when the piston is moving outward relative to the inner end of the cylinder;
    control valve means which in an open position opens the cylinder to atmospheric pressure to enable the piston to be moved outward, and which in a closed position closes the cylinder to the atmospheric pressure to prevent the piston from moving outward;

sustaining cable linkage means, connected to the piston and wound around the motor shaft, for preventing the shaft from rotating in the retracting direction when the control valve means is closed.

an advancing cable linkage means connected to the throttle and wound around the motor shaft for advancing the throttle when the control valve means is closed, and when power is supplied to the DC electric motor;

microcomputer means for providing discrete power pulses for activating the motor to rotate in the advancing direction, and for causing the control valve means to close when an increase in vehicle speed is desired; for deactivating the motor, and for opening the control valve means when a decrease in speed is desired; and sensing means for continuously detecting vehicle speed and providing signals to the microcomputer means.

4. An apparatus for controlling the speed of a motor vehicle of the type having a throttle and a spring means for urging the throttle toward an idle position which comprises:

a DC electric motor of the type that has a shaft which freewheels when the power is off, and which rotates in an advancing direction when the power is on;

a cylinder having an inner end and an outer end;

a piston within the cylinder;

spring means for urging the piston toward the inner end of the cylinder;

check valve means for allowing air to escape through the check valve means from the cylinder to the atmosphere when the piston moves toward the inner end of the cylinder, for preventing air from entering the cylinder through the check valve means from the atmosphere when the piston is stationary and when the piston is moving outward relative to the inner end of the cylinder;

control valve means which in an open position opens the cylinder to atmospheric pressure to enable the piston to be moved outward, and which in a closed position, closes the cylinder to the atmospheric pressure to prevent the piston from moving outward;

sustaining cable linkage means, connected to the piston and wound around the motor shaft, for preventing the shaft from rotating in the retracting direction when the control valve means is closed;

an advancing cable linkage means connected to the throttle and wound around the motor shaft for advancing the throttle when the control valve means is closed, and when power is supplied to the DC electric motor;

microcomputer means for providing discrete power pulses for activating the motor to rotate in the advancing direction, and for causing the control valve means to close when an increase in vehicle speed is desired; for deactivating the motor, and for opening the control valve means when a decrease in speed is desired;

sensing means for continuously detecting vehicle speed and providing signals to the microcomputer means; and the control valve means being biased normally to the open position, and closes when supplied with a signal from the microcomputer means.

* * * * *